Feb. 25, 1930.  H. P. FIELD  1,748,118
MINE CAR
Original Filed June 8, 1925
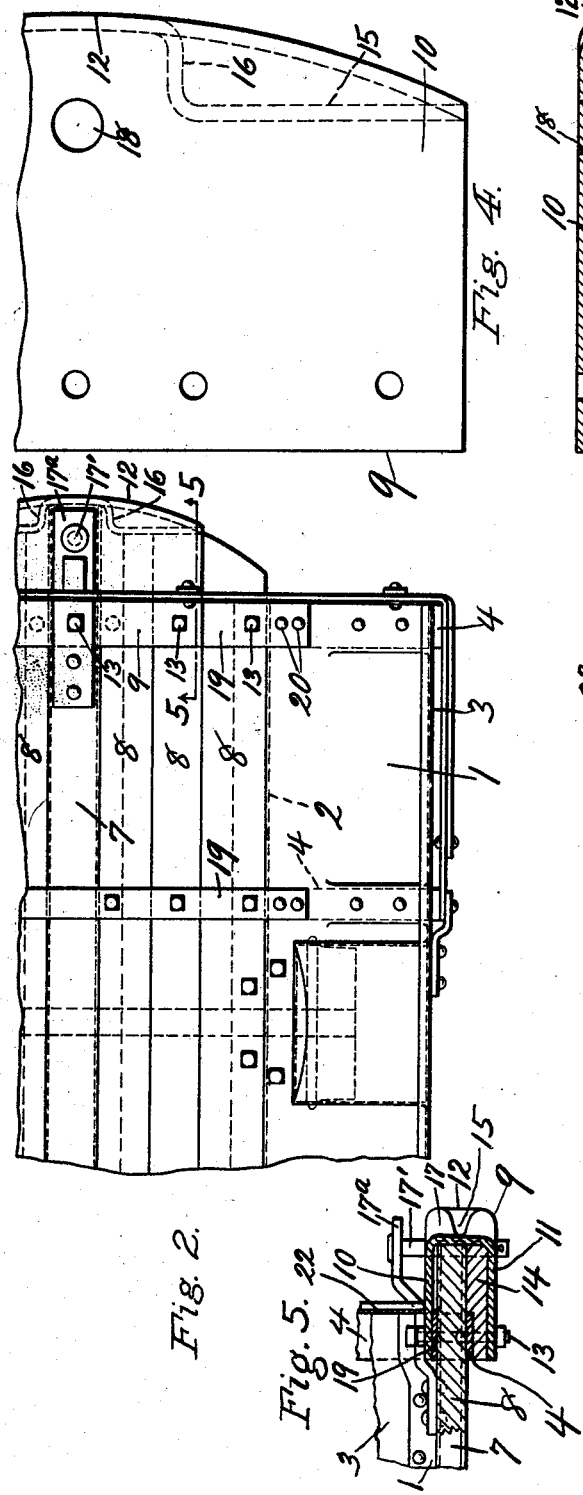
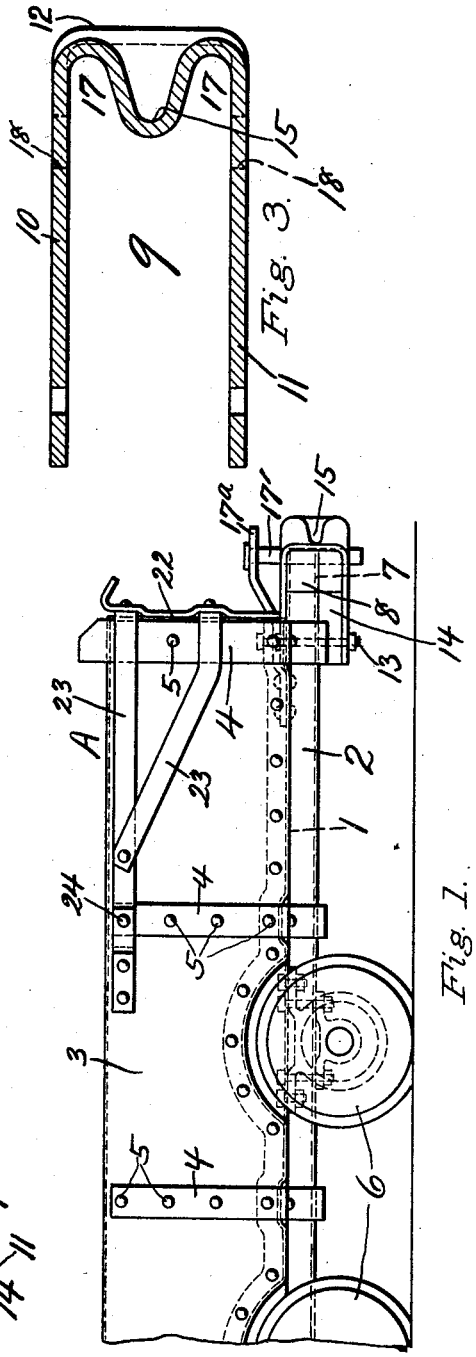
INVENTOR
Harry P. Field
BY
ATTORNEY.

Patented Feb. 25, 1930

1,748,118

UNITED STATES PATENT OFFICE

HARRY P. FIELD, OF BERWICK, PENNSYLVANIA, ASSIGNOR TO AMERICAN CAR AND FOUNDRY COMPANY, OF NEW YORK, N. Y., A CORPORATION OF NEW JERSEY

MINE CAR

Original application filed June 8, 1925, Serial No. 35,639. Divided and this application filed May 7, 1927. Serial No. 189,540.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a side elevation of one end of a car showing the invention applied thereto;

Fig. 2 is a top plan view of the car illustrated in Fig. 1;

Fig. 3 is a sectional view of the bumper of the present invention;

Fig. 4 is a fragmentary top plan view of the bumper, and

Fig. 5 is a fragmentary sectional view taken on the line 5—5 of Fig. 2.

This invention relates to mine cars, referring more particularly to a bumper construction therefor, and is a division of my prior application for mine car filed June 8, 1925, Serial Number 35,639.

It is one object of this invention to provide a mine car having a bumper which will be strong and durable in operation and which will facilitate repairs to the car floor.

Another object of the invention is to provide a mine car having a bumper, a portion of which will serve as a bearing surface for an end gate attached to the car.

In the drawings, a mine car is indicated generally at A and comprises side plates 1 forming the side floor portions of the car and having their edges bent to provide webs 2. Car sides 3 are provided which are carried by the side floor portions 1 and said sides are preferably braced by means of strap braces 4 extending beneath the car body from the top of one side to the top of the other side and secured to the sides by rivets 5 or the like. The car body is mounted on the usual wheels 6.

A draw-bar 7 is provided which is arranged longitudinally of the car with its ends projected beyond the ends of the car, and floor boards 8 form the remainder of the car floor as clearly illustrated in Fig. 2. Referring to this figure, it can be seen that some of the floor boards 8 project beyond the end of the car, and have secured thereon the bumper 9. As clearly shown in Fig. 2, the floor boards 8 adjacent the side floor portion 1 are not engaged by the bumper and may be moved longitudinally to remove them from the car upon removal of the bolts which secure them in position. After the outside floor boards 8 have been removed, the inner floor boards 8 when unbolted may be moved over against the floor sections 1 and then withdrawn past the bumper without removing the latter from the draw-bar 7 or otherwise disturbing the same. The bumper 9 comprises a top plate 10 and a bottom plate 11 and a face plate 12, the plates 10 and 11 extending inwardly as far as the inner edges of the end braces 4 and being secured thereto by bolts 13 which extend through the upper and lower plates 10 and 11, floor boards 8 and filler members 14, which latter are placed between the bottom plate 11 and the bottoms of the floor boards 8. The top plate 10 rests over and is slightly spaced from the tops of the floor boards 8 as clearly shown in Fig. 5.

As heretofore mentioned, the bumper comprises a face plate 12 which latter is preferably slightly curved from end to end, and the same is provided with horizontal depressions 15 commencing at the ends and extending inwardly to a point adjacent the drawbar 7, as indicated at 16, the depressions forming internal recesses 17, and, of course, an internal projection against which latter the floor boards are adapted to contact, as clearly shown in Figs. 2 and 5. It will be apparent from the description just above that the depressions 15 provide, in effect, anti-climbers for an obvious purpose. A bracket 17$^a$ is riveted to the draw-bar 7 and the outer end of this bracket is spaced from the draw-bar and from the bumper to provide an opening to receive the usual coupling link, the bracket being further provided with an opening for a coupling pin 17′ which opening is alined with openings 18 formed in plates 10 and 11, and with an opening in the draw-bar 7.

Extending across the car in line with each brace 4 and beneath the plate 10 is a tie 19 which rests upon the floor boards 8 and upon side floor portions 1, said ties being connected to the side floor portions by rivets 20 and to the floor boards 8 by bolts 13, certain of said bolts 13 also passing through the bracket 17ª, the tie plate 19, and through the top and bottom plates 10 and 11 of the bumper.

One end of the car is provided with a swinging end gate 22 carried by arms 23 pivotally connected to the car side at 24, the gate being provided with an opening for the bracket 17 and having its lower edge seated upon plate 10 of the bumper, the latter providing a bearing surface for said lower edge, as will be obvious.

The drawings disclose only one end of the car, but it is to be understood that the structure shown is duplicated at the opposite end of the car, and no particular description of said opposite end is deemed necessary. The opposite end of the car may be provided with an end gate if desired, or with any suitable end closure well known in the art.

What is claimed is:

1. In a mine car, a bumper having a plane impact receiving center portion and inwardly depressed portions on each side thereof forming anti-climbers.

2. A bumper comprising top and bottom plates and a face plate having a horizontally extending depression on each side of the center extending inwardly only to a point adjacent said center whereby to define a plane centrally arranged impact receiving portion.

3. A bumper comprising horizontal parallel top and bottom plates and a face plate, the latter being provided with oppositely arranged spaced horizontal depressions extending from each side thereof toward the center of said face plate.

4. A bumper of the kind described comprising a top plate, a bottom plate and a face plate connecting the top and bottom plates and having a central plane surface and recessed ends on each side of said plane surface to define anti-climbers for reinforcing the central plane surface.

5. In a mine car, a projecting floor portion, a bumper supported on the projecting floor portion and provided with a corrugation on each side of the center thereof providing spaced anti-climbers and a central plane impact receiving surface, said corrugations contacting with the projecting floor portions on each side of the center of the bumper.

6. A bumper of the kind described comprising a top plate, a bottom plate, and a face plate connecting the top and bottom plates and having a plane surface arranged midway between the ends thereof and a recess formed in each end of said plate and extending to the plane surface and increasing in depth from the end to the plane surface.

7. In a mine car, a center floor portion projecting from the end thereof and a bumper carried by said projecting floor portion and comprising a top plate, a bottom plate and a face plate connecting said top and bottom plates and having a recess adjacent each end thereof and on each side of the center thereof to define spaced internal projections for engagement with said center floor portion.

In witness whereof I have hereunto set my hand.

HARRY P. FIELD.